United States Patent
Zhu et al.

(10) Patent No.: US 8,521,667 B2
(45) Date of Patent: Aug. 27, 2013

(54) DETECTION AND CATEGORIZATION OF MALICIOUS URLS

(75) Inventors: Bin Benjamin Zhu, Edina, MN (US); Hyunsang Choi, Seoul (KR); Heejo Lee, Seoul (KR)

(73) Assignee: Microsoft Corporation, Redmond, WA (US)

( * ) Notice: Subject to any disclaimer, the term of this patent is extended or adjusted under 35 U.S.C. 154(b) by 248 days.

(21) Appl. No.: 12/969,209

(22) Filed: Dec. 15, 2010

(65) Prior Publication Data

US 2012/0158626 A1     Jun. 21, 2012

(51) Int. Cl.
*G06F 15/18* (2006.01)
*G06F 21/00* (2006.01)

(52) U.S. Cl.
USPC .......................................................... 706/13

(58) Field of Classification Search
USPC ................................. 706/12, 13; 726/11, 22
See application file for complete search history.

(56) References Cited

U.S. PATENT DOCUMENTS

| | | | |
|---|---|---|---|
| 7,774,459 B2 | 8/2010 | Wang et al. | |
| 2008/0289047 A1 | 11/2008 | Benea et al. | |
| 2008/0301116 A1 | 12/2008 | Wang et al. | |
| 2009/0094175 A1* | 4/2009 | Provos et al. | 706/12 |
| 2010/0077481 A1 | 3/2010 | Polyakov et al. | |
| 2010/0153316 A1 | 6/2010 | Duffield et al. | |
| 2012/0158626 A1 | 6/2012 | Zhu et al. | |

FOREIGN PATENT DOCUMENTS

WO    WO2013009713 A2    1/2013

OTHER PUBLICATIONS

Aha, "Lazy Learning", retrieved on Aug. 26, 2010 at <<http://www.kamuzonde.com/readings/prediction/aha_airev97.pdf>>, Kluwer Academic Publishers, Artificial Intelligence Review, vol. 11, 1997, pp. 7-10.

"APIs for GeoIP Products", retrieved on Aug. 26, 2010 at <<http://www.maxmind.com/app/api>>, MaxMind Inc., 2010, pp. 1.

"Cisco IronPort Web Reputation Technology: Protecting Against URL Based Threats", retrieved on Aug. 30, 2010 at <<http://www.ironport.com/technology/ironport_web_reputation.html>>, Cicso Systems, 2010, pp. 1-3.

Cortes, et al., "Support Vector Networks", retrieved on Aug. 26, 2010 at <<http://citeseerx.ist.psu.edu/viewdoc/download?doi=10.1.1.15.9362&rep=rep1&type=pdf>>, Kluwer Academic Publishers, Machine Learning, vol. 20, No. 3, Sep. 1995, pp. 273-297.

Cova, et al., "Detection and Analysis of Drive-by-Download Attacks and Malicious JavaScript Code", retrieved on Aug. 26, 2010 at <<http://www.cs.ucsb.edu/~vigna/publications/2010_cova_kruegel_vigna_Wepawet.pdf>>, ACM, Proceedings of International Conference on World Wide Web (WWW), Raleigh, North Carolina, Apr. 2010, pp. 281-290.

(Continued)

*Primary Examiner* — Jeffrey A Gaffin
*Assistant Examiner* — Ola Olude Afolabi
(74) *Attorney, Agent, or Firm* — Lee & Hayes, PLLC

(57) ABSTRACT

This document describes techniques for using features extracted from a URL to detect a malicious URL and categorize the malicious URL as one of a phishing URL, a spamming URL, a malware URL or a multi-type attack URL. The techniques employ one or more machine learning algorithms to train classification models using a set of training data which includes a known set of benign URLs and a known set of malicious URLs. The classification models are then employed to detect and/or categorize a malicious URL.

17 Claims, 6 Drawing Sheets

(56) References Cited

OTHER PUBLICATIONS

Fette, et al., "Learning to Detect Phishing Emails", retrieved on Aug. 26, 2010 at <<http://citeseerx.ist.psu.edu/viewdoc/download-?doi=10.1.1.90.3251&rep=rep1&type=pdf>>, Carnegie Mellon Cyber Laboratory Technical Report: CMU-CyLab-06-012, Jun. 2006, pp. 1-16.

Garera, et al., "A Framework for Detection and Measurement of Phishing Attacks", retrieved on Aug. 26, 2010 at <<http://citeseerx.ist.psu.edu/viewdoc/download?doi=10.1.1.142.4092&rep=rep1&type=pdf>>, ACM, Proceedings of Workshop on Recurring Malcode (WORM), Alexandria, Virginia, Nov. 2007, pp. 1-8.

Glosser, "DNS-BH—Malware Domain Blocklist: Malware Prevention through Domain Blocking (Black Hole DNS Sinkhole)", retrieved on Aug. 26, 2010 at <<http://www.malwaredomains.com>>, DNS-BH—Malware Domain Blocklist, 2010, pp. 1-19.

Guan, et al., "Anomaly Based Malicious URL Detection in Instant Messaging", retrieved on Aug. 26, 2010 at <<http://jwis2009.nsysu.edu.tw/location/paper/Anomaly%20Based%20Malicious%20URL%20Detection%20in%20Instant% 20Messaging.pdf>>, Joint Workshop on Information Security (JWIS), 2009, pp. 1-14.

Holz, et al., "Detection and Mitigation of Fast-Flux Service Networks", retrieved on Aug. 26, 2010 at <<http://content.imamu.edu.sa/Scholars/it/net/16_measuring_and _detecting_slide.pdf>>, Proceedings of Network and Distributed System Security Symposium (NDSS), 2008, pp. 1-42.

Joachims, "Making Large-Scale SVM Learning Practical", retrieved on Aug. 26, 2010 at <<https://eldorado.tu-dortmund.de/dspace/bitstream/2003/2596/1/report24.pdf>>, Universtiy of Dortmund, LS-8 Report 24, Jun. 1998, pp. 1-17.

"jwSpamSpy: E-mail spam filter for Microsoft Windows", retrieved on Aug. 26, 2010 at <<http://www.jwspamspy.net>>, joewein.de LLC, 2004-2007, pp. 1.

L'Huillier, et al., "Online Phishing Classification Using Adversarial Data Mining and Signaling Games", retrieved on Aug. 26, 2010 at <<http://www.sigkdd.org/explorations/issues/11-2-2009-12/v11-2-18-CSI-LHuillier.pdf>>, ACM, SIGKDD Explorations, vol. 11, No. 2, 2009, pp. 92-99.

Lee, et al., "Uncovering Social Spammers: Social Honeypots + Machine Learning", retrieved on Aug. 26, 2010 at <<http://students.cse.tamu.edu/kyumin/papers/lee10sigir.pdf>>, ACM, Proceedings of International Conference on Research and Development in Information Retrieval, Geneva, Switzerland, Jul. 2010, pp. 435-442.

Ma, et al., "Beyond Blacklists: Learning to Detect Malicious Web Sites from Suspisious URLs", retrieved on Aug. 26, 2010 at <<http://citeseerx.ist.psu.edu/viewdoc/download?doi=10.1.1.153.276&rep=rep1&type=pdf>>, ACM, Proceedings of International Conference on Knowledge Discovery and Data Mining (KDD), Paris, France, 2009, pp. 1245-1254.

Ma, et al., "Identifying Suspicious URLs: An Application of Large-Scale Online Learning", retrieved on Aug. 26, 2010 at <<http://citeseerx.ist.psu.edu/viewdoc/download?doi=10.1.153.3318&rep=rep1type=pdf>>, ACM, Proceedings of International Conference on Machine Learning, Montreal, Canada, 2009, pp. 681-688.

"McAfee SiteAdvisor software", retrieved on Aug. 26, 2010 at <<http://www.siteadvisor.com/>>, McAfee, Inc, 2003-2010, pp. 1.

McGrath, et al., "Behind Phishing: An Examination of Phisher Modi Operandi", retrieved on Aug. 26, 2010 at <<http://www.cs.indiana.edu/~minaxi/pubs/leet08.pdf>>, USENIX Association, Proceedings of Workshop on Large-Scale Exploits and Emergent Threats, San Francisco, California, Article 4, 2008, pp. 1-8.

Moore, et al., "Temporal Correlations between Spam and Phishing Websites", retrieved on Aug. 26, 2010 at <<http://www.usenix.org/event/leet09/tech/full_papers/moore/moore.pdf>>, USENIX Assocciation, Workshop on Large-Scale Exploits and Emergent Threats (LEET), Boston, MA, Apr. 2009, pp. 1-8.

Moshchuk, et al., "SpyProxy: Execution-based Detection of MaliciousWeb Content", retrieved on Aug. 26, 2010 at <<http://www.anti-keylogger.org/articles/spyproxy.pdf>>, USENIX Association, Proceedings of Security Symposium, Boston, MA, Article 3, 2007, pp. 1-16.

Ntoulas, et al., "Detecting Spam Web Pages through Content Analysis", retrieved on Aug. 26, 2010 at <<http://citeseerx.ist.psu.edu/viewdoc/download?doi=10.1.1.70.897&rep=rep1&type=pdf>>, ACM, Proceedings of International Conference on World Wide Web (WWW), Edinburgh, Scotland, May 2006, pp. 83-92.

"Paysite Cash Becomes a Partner of WOT (Web Of Trust)", retrieved on Aug. 26, 2010 at <<http://www.mywot.com/>>, WOT Services, 2010, pp. 1.

"PhishTank: Join the fight against phishing", retrieved on Aug. 26, 2010 at <<http://www.phishtank.com/>>, OpenDNS, 2010, pp. 1-2.

Prakash, et al., "PhishNet: Predictive Blacklisting to Detect Phishing Attacks", retrieved on Aug. 26, 2010 at <<http://citeseerx.ist.psu.edu/viewdoc/download?doi=10.1.1.156.970&rep=rep1&type=pdf>>, IEEE Proceedings of Conference on Information Communications, San Diego, California, 2010, pp. 346-350.

Provos, et al., "All Your iFrames Point to Us", retrieved on Aug. 26, 2010 at http://mmnet.iis.sinica.edu.tw/botnet/file/20100524/20100524_2_p.pdf>>, USENIX Association, Proceedings of Security Symposium, Aug. 2008, pp. 1-42.

Quinlan, "C4.5: Programs for Machine Learning", Morgan Kaufmann Publishers, San Francisco, CA., 1993, pp. 1-345.

Ramachandran, et al., "Understanding the Network-Level Behavior of Spammers", retrieved on Aug. 26, 2010 at <<http://citeseerx.ist.psu.edu/viewdoc/download?doi=10.1.1.111.2179&rep=rep1&type=pdf>>, SIGCOMM Computer Communication Review, Proceedings of Conference on Applications, Technologies, Architectures, and Protocols for Computer Communications, vol. 36, No. 4, Pisa, Italy, 2006, pp. 291-302.

Seifert, et al., "Identification of Malicious Web Pages with Static Heuristics", retrieved on Aug. 26, 2010 at <<http://>>citeseerx.ist.psu.edu/viewdoc/download?doi=10.1.1.139.8392&rep=rep1&yype=pdf>>, Australasian Telecommunication Networks and Applications Conference (ATNAC), Adelaide, SA, Dec. 2008, pp. 91-96.

"Trend Micro Online URL Query—Feedback System", retrieved on Aug. 26, 2010 at <<http://reclassify.wrs.trendmicro.com/>>, Trend Micro, Inc., 1989-2010, pp. 1.

Tsoumakas, et al., "Mining Multi-label Data", retrieved on Aug. 26, 2010 at <<http://lkm.fri.uni-lj.si/xaigor/slo/pedagosko/dr-ui/tsoumakas09-dmkdh.pdf>>, Springer Berlin, Data Mining and Knowledge Discovery Handbook, 2010, pp. 1-20.

Tsoumakas, et al., "Random k-Labelsets for Multi-Label Classification", retrieved on Aug. 26, 2010 at <<http://lpis.csd.auth.gr/publications/tsoumakas-tkde10.pdf>>, IEEE Transactions on Knowledge and Data Engineering, 2010, pp. 1-12.

Wang, et al., "Automated Web Patrol with Strider HoneyMonkeys: Finding Web Sites That Exploit Browser Vulnerabilities", retrieved on Aug. 26, 2010 at <<http://citeseerx.ist.psu.edu/viewdoc/download?doi=10.1.1.63.812&rep=rep1&type=pdf>>, Internet Society, Proceedings of Network and Distributed System Security Symposium (NDSS), San Diego, California, Feb. 2006, pp. 1-15.

Wang, et al., "Spam Double-Funnel: Connecting Web Spammers with Advertisers", retrieved on Aug. 26, 2010 at <<http://citeseerx.ist.psu.edu/viewdoc/download?doi=10.1.1.78.810rep=rep1&type=pdf>>, ACM, Proceedings of International Conference on World Wide Web (WWW), Banff, Canada, May 2007, pp. 291-300.

"Websense: ThreatSeeker Network: Foundation of the Websense Technoloy", retrieved on Aug. 26, 2010 at <<http://www.websense.com/content/ThreatSeeker.aspx>>, Websense, Inc., 2010, pp. 1.

Whittaker, et al., "Large-Scale Automatic Classification of Phishing Pages", retrieved on Aug. 26, 2010 at <<http://www.isoc.org/isoc/conferences/ndss/10/pdf/08.pdf>>, Internet Society, Proceedings of Network and Distributed System Security Symposium (NDSS), 2010, pp. 1-14.

Xiang, et al., "A Hybrid Phish Detection Approach by Identity Discovery and Keywords Retrieval", retrieved on Aug. 26, 2010 at <<http://nslab.kaist.ac.kr/courses/2009/cs712/paperlist/3-10.pdf>>, ACM, Proceedings of International Conference on World Wide Web (WWW), Madrid, Spain, Apr. 2009, pp. 571-581.

Yang, "An Evaluation of Statistical Approaches to Text Categorization", retrieved on Aug. 26, 2010 at <<http://citeseerx.ist.psu.edu/ viewdoc/download?doi=10.1.1.109.2516&rep=rep1&type=pdf>>, Kluwer Academic Publishers, Information Retrieval, vol. 1, 1999, pp. 69-90.

Zhang, et al., "A k-Nearest Neighbor Based Algorithm for Multi-label Classification", retrieved on Aug. 26, 2010 at <<http://citeseerx.ist.psu.edu/viewdoc/download?doi=10.1.1.86.9501&rep=rep1&type=pdf>>, IEEE Proceedings of International Conference on Granular Computing, vol. 2, 2005, pp. 718-721.

Zhang, et al., "CANTINA: A Content-Based Approach to Detecting Phishing Web Sites", retrieved on Aug. 26, 2010 at <<http://citeseerx.ist.psu.edu/viewdoc/download?doi=10.1.1.72.2809&rep=rep1&type=pdf>>, ACM, Proceedings of International World Wide Web Conference (WWW), Banff, Canada, May 2007, pp. 639-648.

Zhang, et al., "Highly Predictive Blacklist", retrieved on Aug. 26, 2010 at <<http://mtc.sri.com/pdfs/HighlyPredictiveBlacklist-SRI-TR-Format.pdf>>, SRI Internationl, Apr. 12, 2007, pp. 1-42.

Zhang, et al., "ML-KNN: A Lazy Learning Approach to Multi-Label Learning", retrieved on Aug. 26, 2010 at <<http://citeseerx.ist.psu.edu/viewdoc/download?doi=10.1.1.89.7148&rep=rep1&type=pdf>>, Elsevier Science Inc. New York, Pattern Recognition, vol. 40, No. 7, Jul. 2007, pp. 2038-2048.

"Anti-Phishing Working Group", http://www.antiphishing.org/, Retrieved Date: Feb. 12, 2013, 2 pages.

Aggarwal et al., "PhishAri: Automatic Realtime Phishing Detection on Twitter ", In Seventh IEEE APWG eCrime Researchers Summit, Oct. 23, 2012, 12 pages.

Sheng et al., "An Empirical Analysis of Phishing Blacklists", In Proceeding of Sixth Conference on Email and Anti-Spam, Published Date: Jul. 16, 2009, 10 pages.

Chen et al., "Fighting Phishing with Discriminative Keypoints Features", In Journal of IEEE Internet Computing, vol. 13, No. 3, Published Date: May 2009, 8 pages.

Choi et al., "Detecting Malicious Web Links and Identifying Their Attack Types", In Proceedings of the 2nd USENIX Conference on Web Application Development, Published Date: Jun. 15, 2011, 12 pages.

Chou et al., "Client-side Defense Against Web-Based Identify Theft", In Proceedings of the 11th Annual Network and Distributed System Security Symposium, Published Date: Feb. 5, 2004, 16 pages.

Eshete et al., "BINSPECT: Holistic Analysis and Detection of Malicious Web Pages ", In 8th International Conference on Security and Privacy in Communication Networks, Published Date: Sep. 3, 2012, 18 pages.

Fette et al., "Learning to Detect Phishing Emails", In Proceedings of the 16th International Conference on World Wide Web, Published Date: May 8, 2007, 8 pages.

Fu et al., "Detecting Phishing Web Pages with Visual Similarity Assessment Based on Earth Mover's Distance (EMD)", In Journal of IEEE Transactions on Dependable and Secure Computing, vol. 3, No. 4, Published Date: Oct. 2006, 11 pages.

Gyongyi et al., "Web Spam Taxonomy ", In 1st International Workshop on Adversarial Information Retrieval on the Web, Published Date: May 2005, 9 pages.

Huang et al., "A SVM-based Technique to Detect Phishing URLs ", In Journal of Information Technology, Published Date: Jul. 2012, 5 pages.

Liu et al., "An Antiphishing Strategy Based on Visual Similarity Assessment", In Journal of IEEE Internet Computing, vol. 10, Issue 2, Published Date: Mar. 2006, 8 pages.

Ma et al., "Identifying Suspicious URLs: An Application of Large-Scale Online Learning", In Proceedings of the 26th International Conference on Machine Learning, Published Date: Jun. 14, 2009, 8 pages.

McGrath et al., "Behind Phishing: An Examination of Phisher Modi Operandi ", In Proceedings of the 1st Usenix Workshop on Large-Scale Exploits and Emergent Threats, Published Date: Apr. 15, 2008, 8 pages.

Moore et al., "Examining the Impact of Website Take-Down on Phishing", In Proceedings of the Anti-Phishing Working Groups 2nd Annual eCrime Researchers Summit, Published Date: Oct. 4, 2007, 13 pages.

Ntoulas et al., "Detecting Spam Web Pages through Content Analysis", In Proceedings of the 15th International Conference on World Wide Web, Published Date: May 23, 2006, 10 pages.

Ramachandran et al., "Understanding the Network-Level Behaviors of Spammers", In Proceedings of the Conference on Applications, Technologies, Architectures, and Protocols for Computer Communications, Published Date: Sep. 11, 2006, 12 pages.

Ronda et al., "Itrustpage: A User-Assisted Anti-Phishing Tool", In Proceedings of the 3rd ACM SIGOPS/EuroSys European Conference on Computer Systems, Published Date: Apr. 1, 2008, 12 pages.

Ross et al., "Stronger Password Authentication Using Browser Extensions", In Proceedings of the 14th conference on USENIX Security Symposium, vol. 14, Published Date: Jul. 31, 2005, 15 pages.

Whittaker et al., "Large-Scale Automatic Classi?cation of Phishing Pages", In Proceedings of the 17th Annual Network and Distributed System Security Symposium, Published Date: Feb. 28, 2010, 14 pages.

Zhang et al., "A Prior-based Transfer Learning Method for the Phishing Detection", In Journal of Networks, vol. 7, Issue 8, Published Date: Aug. 2012, 7 pages.

Zhang et al., "CANTINA: A Content-Based Approach to Detecting Phishing Web Sites", In Proceedings of the 16th International Conference on World Wide Web, Published Date: May 8, 2007, 10 pages.

"Phishing Activity Trends Report", obtained from http://docs.apwg.org/reports/apwg_report_Q4_2009.pdf, Oct.-Dec. 2009, 11 pages.

* cited by examiner

DETECTION AND CATEGORIZATION OF MALICIOUS URLS

BACKGROUND

Due to the increased popularity and use of the World Wide Web, web users and their computing systems have become more exposed to cyber attacks. Malicious Uniform Resource Locators (URLs) are widely used in the computing industry to perform cyber attacks on web users and their computing systems. Malicious URLs include phishing URLs, spamming URLs and malware URLs.

Phishing typically involves sending an email intended to deceive a recipient into clicking on a malicious URL that links to an illegitimate web page, instead of an authentic web page. Spamming may involve sending or providing users with unsolicited information via a malicious URL which has been configured to manipulate the relevance or prominence of resources indexed by a search engine. Malware typically involves using a malicious URL to secretly access and infect a computing system without the owner's informed consent or knowledge.

The detection of malicious URLs limits web-based attacks by preventing web users from visiting malicious URLs or warning web users prior to accessing content located at a malicious URL. Thus, malicious URL detection protects computing system hardware/software from computer viruses, prevents execution of malicious or unwanted software, and helps avoid accessing malicious URLs web users do not want to visit.

Conventional systems employ various sources (e.g., human feedback) to build a blacklist, which is a set list of known malicious URLs. Blacklisting identifies a malicious URL via matching a received URL with a URL on the blacklist. Although blacklisting is an effective means for identifying a known malicious URL, blacklisting cannot detect unknown malicious URLs. Therefore, it is easy for cyber attackers to evade conventional blacklisting systems by continuously modifying the manner in which malicious URLs are configured, thereby finding new approaches to attack web users, web browsers, search engines and the like.

SUMMARY

This document describes techniques for using one or more classification models to detect a malicious URL and categorize the malicious URL as one of a phishing URL, a spamming URL, a malware URL, or a multi-type attack URL. The techniques train the classification models using a set of training data and one or more machine learning algorithms. The training data includes a known set of benign URLs and a known set of malicious URLs. The techniques extract features associated with the known URLs, and use the machine learning algorithms to train the classification models to detect and categorize an unknown malicious URL.

The classification models may then be used in association with a search engine and/or web browser to determine whether an unknown URL is a malicious URL, and if it is, categorize the unknown malicious URL. The classification models may be implemented on one or more devices to help protect web users, web browsers, search engines, and the like. In response to receiving an unknown URL, the techniques determine whether the unknown URL is a malicious URL and may warn a web user of the category (e.g., type) of the malicious URL.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, algorithms, and/or technique(s) as permitted by the context above and throughout the document.

BRIEF DESCRIPTION OF THE CONTENTS

The detailed description is presented with reference to accompanying figures. In the figures, the left-most digit(s) of a reference number identifies the figure in which the reference number first appears. The use of the same reference numbers in different figures indicates similar or identical items.

Figure 4:
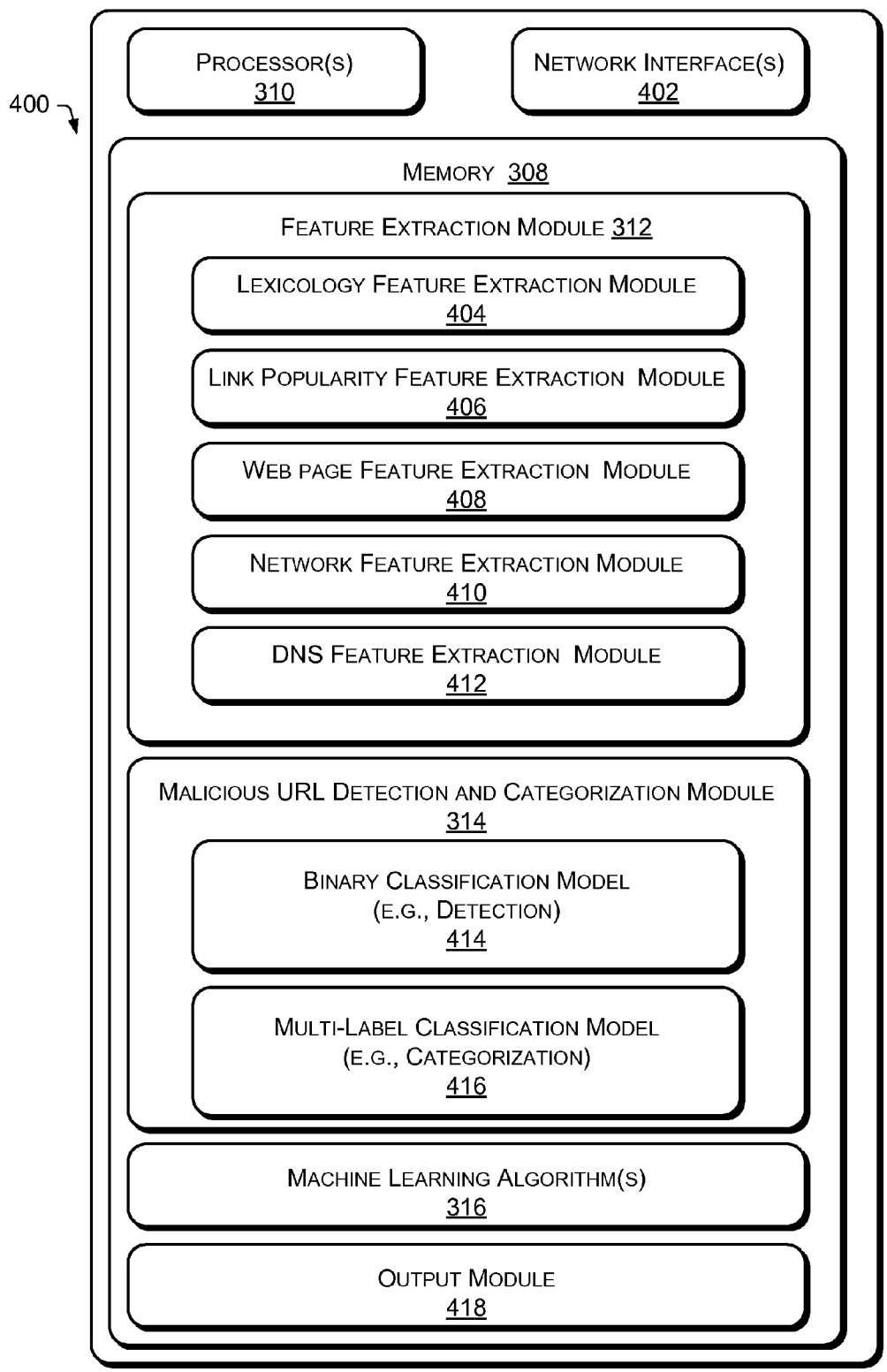

FIG. 4 further illustrates an example computing system for implementing the detection and categorization of malicious URLs, in accordance with various embodiments.

Figure 5:
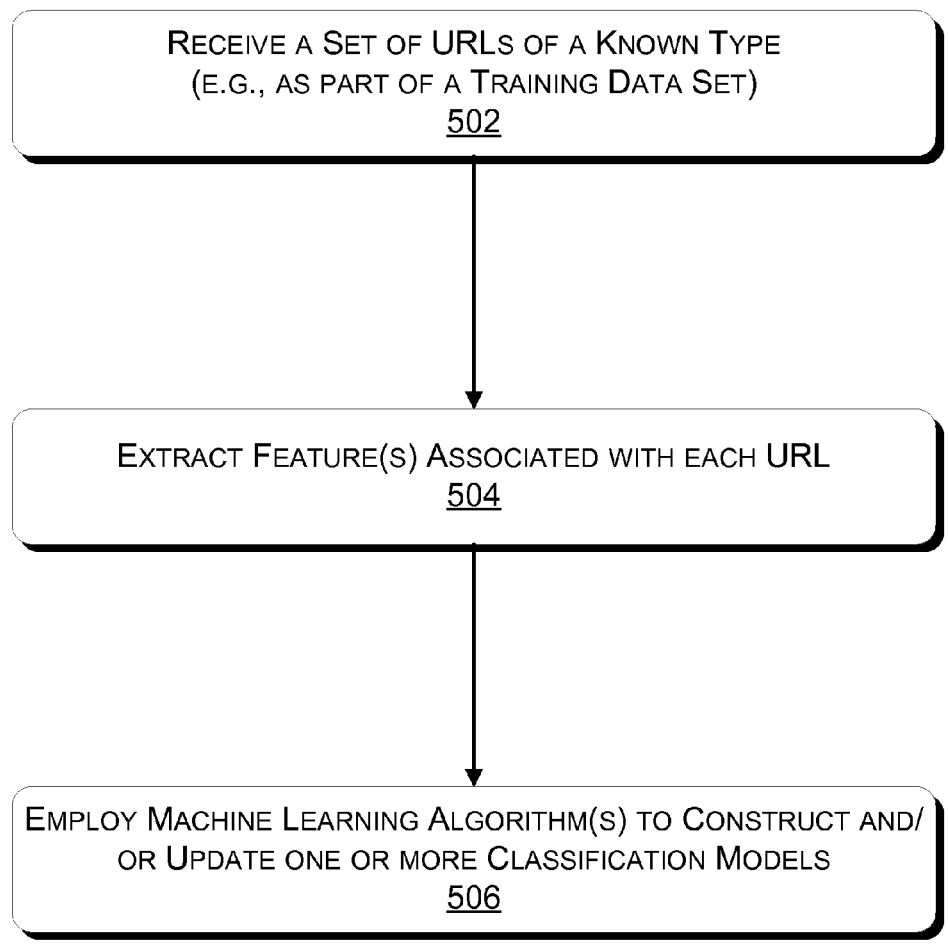

FIG. 5 illustrates an example process that trains the one or more classification models for malicious URL detection and categorization, in accordance with various embodiments.

Figure 6:
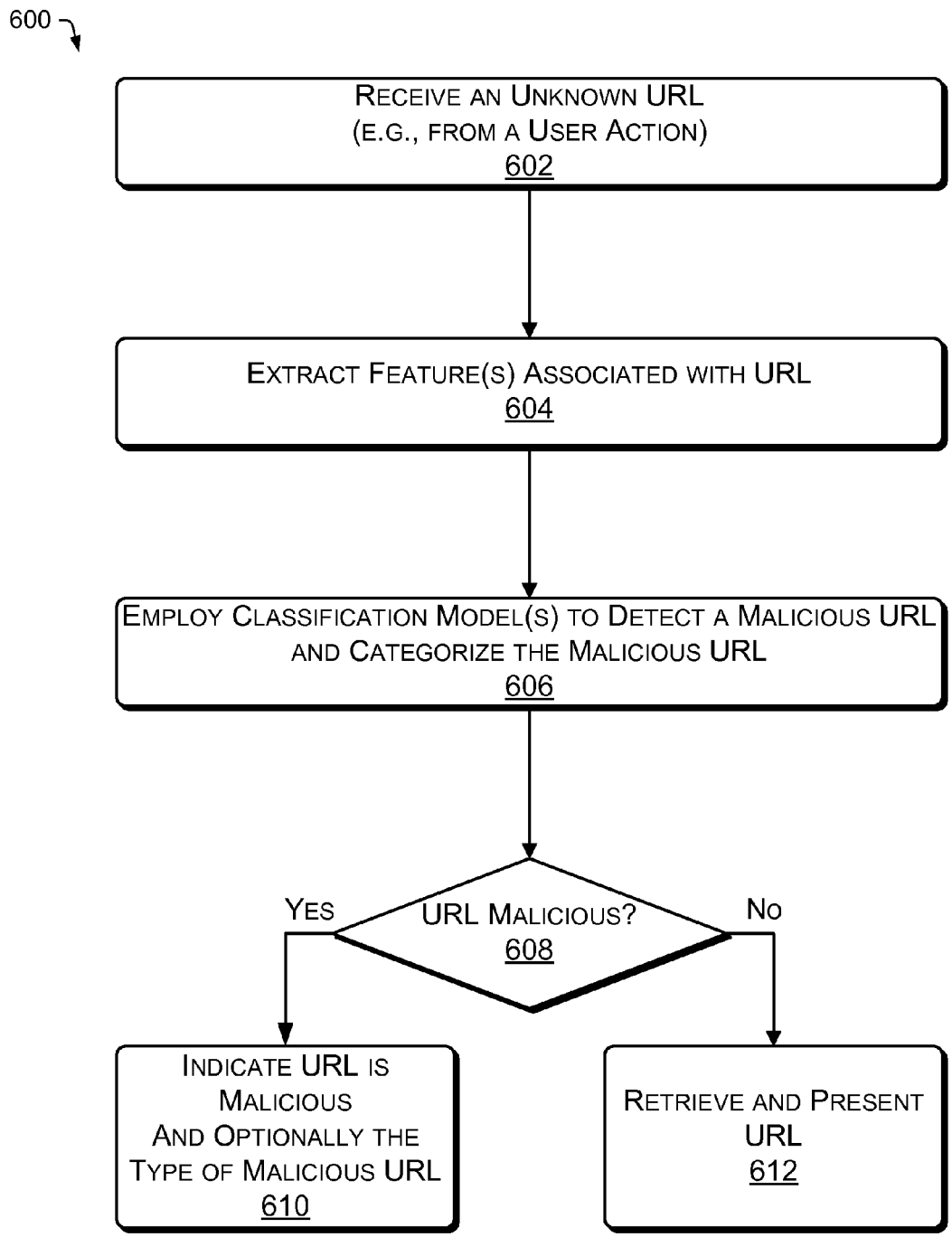

FIG. 6 illustrates an example process that detects and categorizes a malicious URL, in accordance with various embodiments.

DETAILED DESCRIPTION

Overview

The following description sets forth a system for detecting and categorizing a malicious URL. For purposes of this document, the detection and categorization of a malicious URL occurs when an unknown URL is received or submitted. An unknown URL is a URL not known by a computing system component (e.g., web browser, search engine, security modules, system filters and the like) to be a malicious URL or a benign URL. For example, an unknown URL may be an unfamiliar new malicious URL, recently made available via the World Wide Web.

Classification models are employed to detect malicious URLs and categorize the malicious URLs as a phishing URL, a spamming URL, a malware URL, or a multiple-type attack URL which attempts to launch multiple different types of attacks (e.g., any combination of phishing, spamming, and malware attacks). Although this document describes classification models, a single classification model may be implemented to perform functions described herein. In various embodiments, if a malicious URL is detected, then the system will indicate that the URL is a malicious URL to a web user or web browser executing on a computing system.

The system is configured to detect and categorize malicious URLs by applying the classification models to various discriminative features extracted from an unknown URL.

Figure 1:
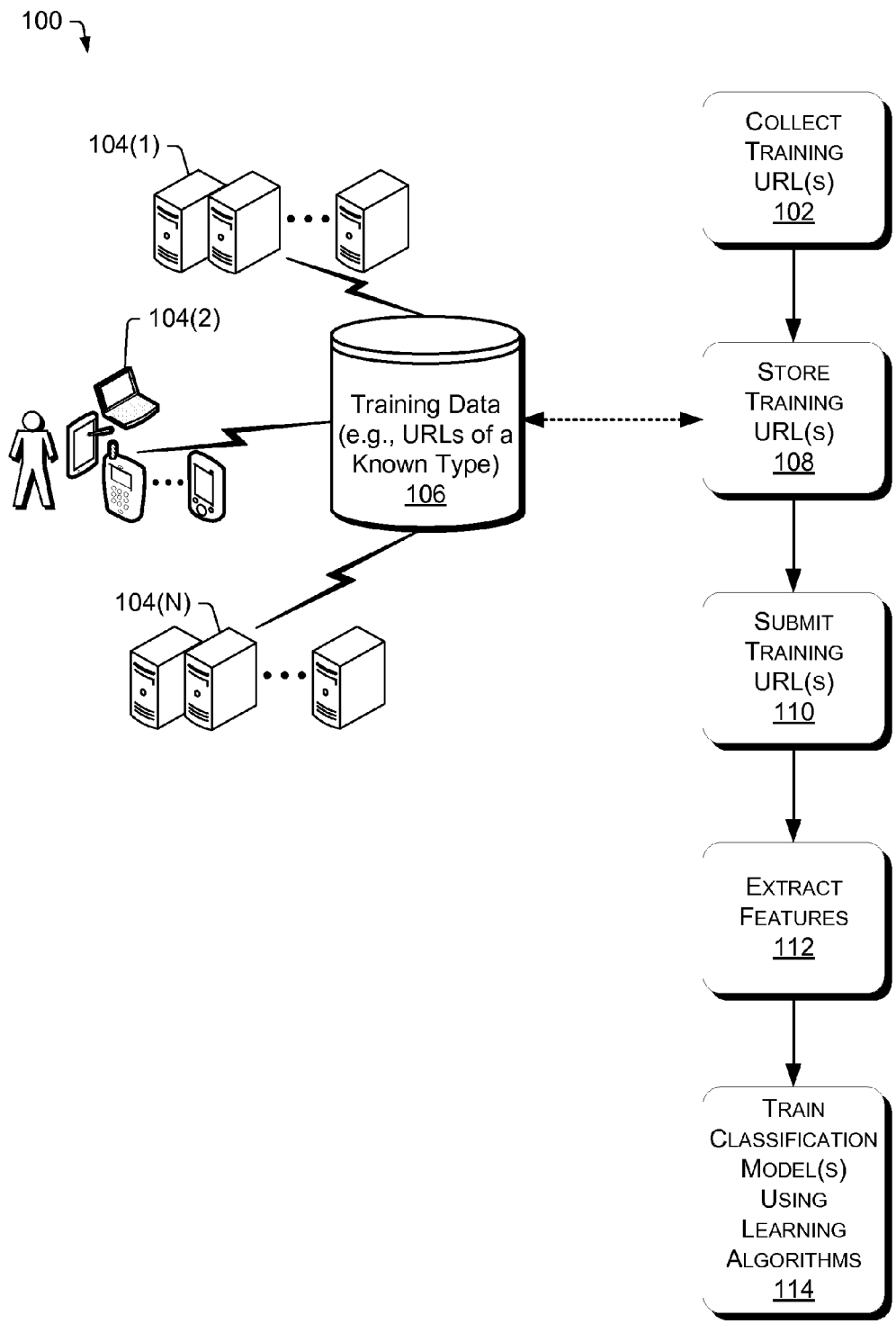
FIG. 1 illustrates an example block diagram showing a training stage environment, in accordance with various embodiments.

FIG. 1 illustrates an example block diagram depicting an environment that trains the classification models. As shown in training stage 100, the system collects training URLs at 102 from one or more sources 104(1), 104(2), . . . , 104(N), and then stores the training URLs in a database 106 as training data URLs at 108. The training data URLs include both a set of known benign URLs and a set of known malicious URLs. Accordingly, each training URL collected is labeled as one of a known malicious URL or a known benign URL for training purposes. Furthermore, each known malicious URLs may also be labeled in accordance with a type of attack which it attempts to launch. For example, the type of attack may be a phishing attack, a spamming attack, a malware attack, or a multi-type attack which attempts to launch multiple different types of attacks (e.g., any combination of phishing, spamming, and malware attacks).

The one or more sources 104(1) . . . (N) may include, for example, Internet sources such as search engines or databases that have access to and knowledge of a large number of known benign and malicious URLs (e.g., thousands of benign URLs and thousands of malicious URLs).

Once collected and stored, the system submits the training URLs at 110, one by one for processing. During processing the system extracts features associated with each submitted training URL at 112. The extracted features are associated with the lexicology of the URL, the link popularity of the URL, the web page content of the URL, network properties associated with the URL, domain name properties associated with the URL, and domain name system (DNS) fluxiness associated with the URL. These features are further discussed in more detail herein.

At 114, the system employs one or more machine learning algorithms to train the classification models using the features extracted for each submitted training URL. In the training stage, the classification models, via the machine learning algorithms, develop decision criteria used to i) classify an unknown URL as a benign or malicious URL (e.g., a binary classification model), and ii) categorize and label the malicious URL based on a type of attack the malicious URL attempts (e.g., a multi-label classification model).

In one embodiment, Support Vector Machine (SVM) is the machine learning algorithm used to train the binary classification model to classify an unknown URL as a malicious URL or a benign URL. In one embodiment, RAkEL is the machine learning algorithm used to train the multi-label classification model to classify an unknown URL as one of a phishing URL, a spamming URL, a malware URL, or a multi-type attack URL. In an alternative embodiment, ML-kNN is the machine learning algorithm used to train the multi-label classification model.

During the training stage, the system is able to continuously adapt and update the classification models at 114. Accordingly, the decision criteria developed by the classification models also continue to adapt and are, therefore, more effective at detecting a malicious URL and categorizing the malicious URL as further discussed herein. This adaptation allows for continually providing optimized results over time as malicious URLs and cyber attackers develop new approaches to try and evade detection.

In various embodiments, the known set of malicious URLs collected for the training data are already labeled as phishing URLs, spamming URLs, malware URLs, or multi-type attack URLs. For example, when selecting known malicious URLs to train the classification models, the system may select a set of known phishing URLs. Therefore, when the system employs the machine learning algorithms to develop decision criteria for the classification models, the decision criteria that decide whether a malicious URL is a phishing URL may be developed based on URL features common to phishing URLs. Similarly, the system may select a set of known spamming URLs, a set of known malware URLs, and a set of known multi-type URLs to train the classification models to label a malicious URL according to the different types of attacks. Thus, the system may split the known set of malicious URLs into separate lists including known phishing URLs, known spamming URLs, and known malware URLs. By definition, multi-type attack URLs may appear on two or more of the separate lists.

The system may use the separate lists to better train the classification models to detect and categorize a malicious URL based on extracted features, as discussed herein, because the different types of malicious URLs often have distinguishable differences when analyzing extracted features associated with the malicious URLs.

Figure 2:
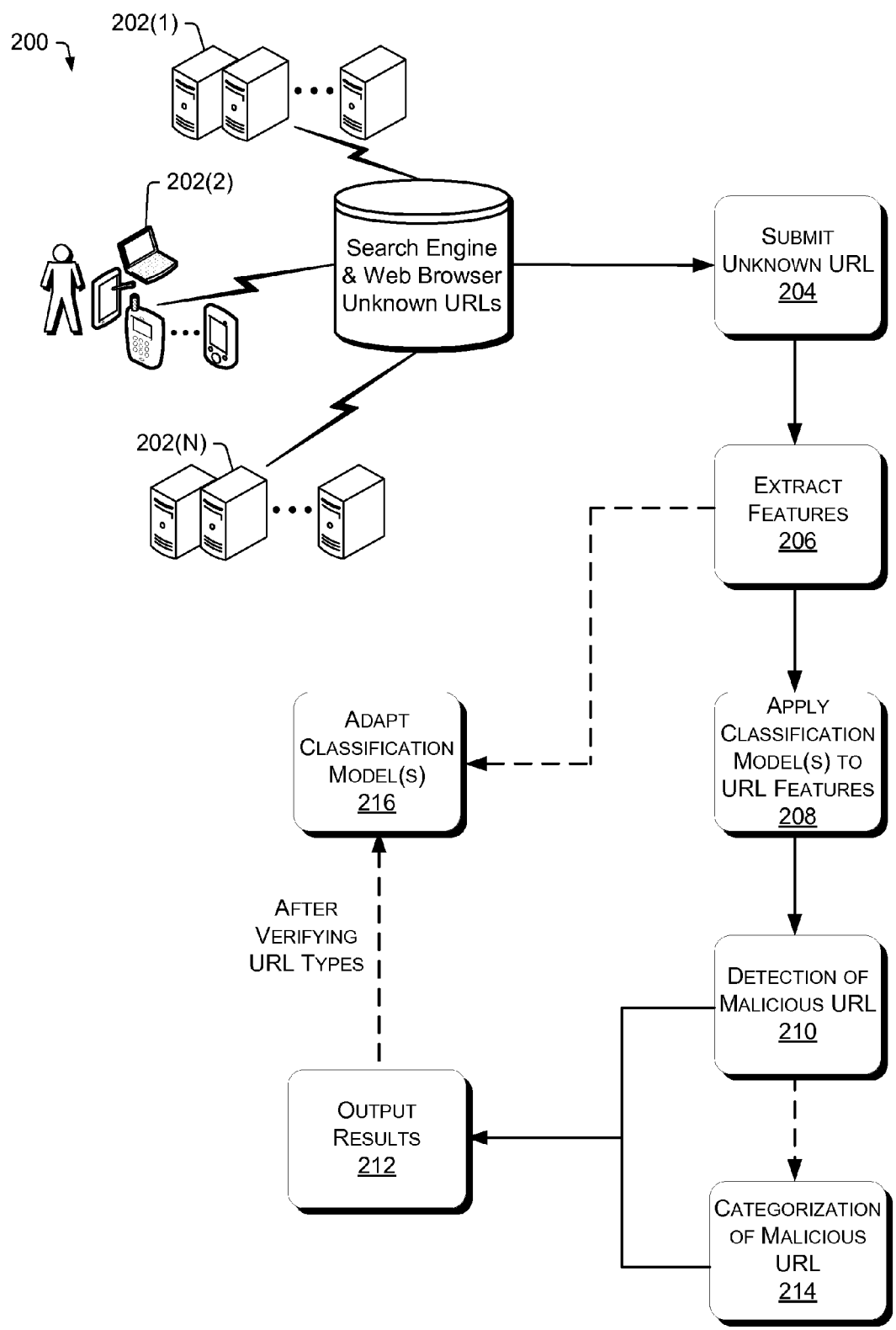
FIG. 2 illustrates an example block diagram showing a malicious URL detection and categorization environment, in accordance with various embodiments.

FIG. 2 illustrates an example block diagram depicting an environment 200 that detects and, optionally categorizes a malicious URL. As shown in detection and categorization stage 200, client computing device(s) or server(s) 202(1), 202(2), . . . , 202(N) may attempt to access an unknown URL. For example, a web user may select an embedded link (e.g., from an email, web page, etc.) or enter a URL in a URL input field of a web browser. Or a search engine may provide the URL in response to a search initiated by the web user. Thus, in various embodiments, the detection and categorization environment 200 is utilized in conjunction with a computing system independent of the training stage discussed with respect to FIG. 1.

At 204, the system submits the unknown URL, and extracts URL features at 206. The feature extraction for an unknown URL is similar to the feature extraction for a known URL at 112 in FIG. 1. At 208, the system applies the classification models (which have already been constructed during the training stage) and employs the classification models to determine (e.g., detect) whether the unknown URL is malicious or benign at 210 (e.g., binary classification). At 212, the results may be output to a web user, a web browser, a search engine, a computing system, a system analyzer, a blacklist, etc.

In various embodiments, if the unknown URL is determined to be malicious, the system may further categorize the malicious URL as a phishing URL, a spamming URL, a malware URL, or a multi-type attack URL at 214 (e.g., multi-label classification), and then outputs the results at 212.

Furthermore, in various embodiments, the machine learning algorithms may continue to be used by the system during the detection and categorization stage 200 to adapt and update the classification models at 216 using features extracted from submitted unknown URLs.

However, prior to updating and adapting the classification models during the detection and categorization stage 200, the output results 212 for a unknown URL must be verified (e.g., human verification, or search engine verification) as an actual benign or malicious URL and, if a malicious URL, a type of malicious URL may optionally be verified. The verification of a benign or malicious URL, and the type of malicious URL, helps avoid disturbing the classification models if erroneous detection occurs.

By considering data associated with a new set of features extracted during the detection and categorization stage 200, the system provides, subsequent to verification, new training data that may adapt the classification models in addition to the training stage discussed with respect to FIG. 1. Thus, the classification models are able to provide better protection against malicious URLs even when cyber attackers are continuously trying to evade detection by modifying the manner in which malicious URLs are configured.

Illustrative Architecture

Figure 3:
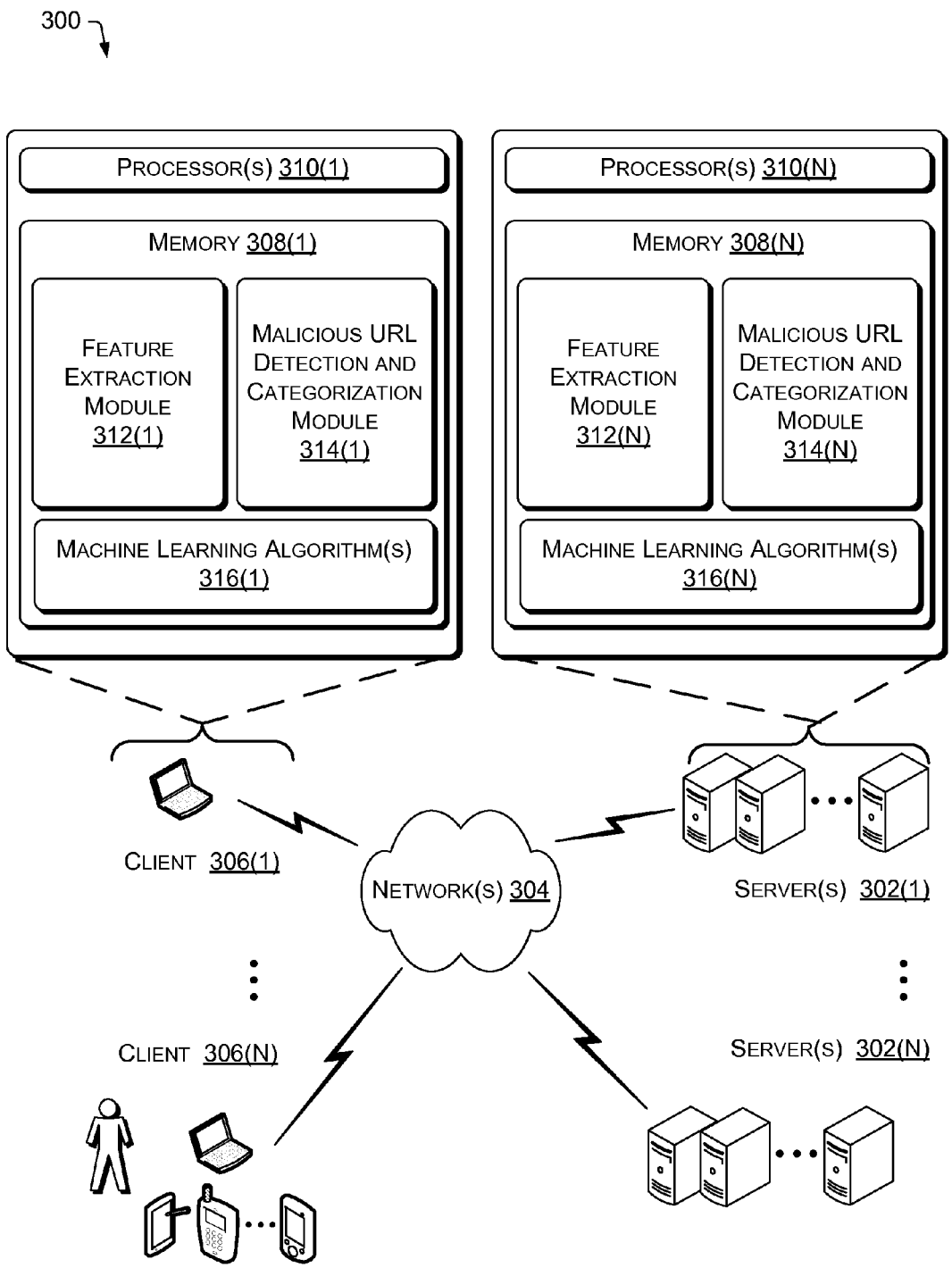
FIG. 3 illustrates an example architecture for implementing the detection and categorization of malicious URLs, in accordance with various embodiments.

FIG. 3 shows an illustrative architecture 300 that may employ the described techniques. To this end, architecture 300 includes one or more server computing devices 302(1) . . . 302(N) communicating through network(s) 304 with one or more client computing devices 306(1) ... 306(N). In one embodiment, the server computing devices 302(1) ... (N) may be one or more web search engines. The client computing devices 306(1) ... (N) may comprise one of an array of computing devices capable of connecting to one or more network(s) 304, such as a server computer, a client computer, a personal computer, a laptop computer, a mobile phone, a personal digital assistant (PDA), tablets, gaming consoles, set top boxes, and the like.

In various embodiments, architecture 300 can be the World Wide Web, including numerous PCs, servers, and other computing devices spread throughout the world. The server computing devices 302(1) ... (N) and the client computing devices 306(1) ... (N) may be coupled to each other in various combinations through a wired and/or wireless network 304, including a LAN, WAN, or any other networking technology known in the art.

The server computing devices 302(1) ... (N) and the client computing devices 306(1) ... (N) each comprise a memory 308(1) ... 308(N) and one or more processors 310(1) ... 310(N). Furthermore, the server computing devices 302(1) ... (N) and the client computing devices 306(1) ... (N) may include a feature extraction module 312(1) ... 312(N), a malicious URL detection and categorization module 314(1) ... 314(N), and machine learning algorithm(s) 316(1) ... 316(N).

The feature extraction module 312(1) ... (N), the malicious URL detection and categorization module 314(1) ... (N), and the machine learning algorithm(s) 316(1) ... (N) are illustrated on a server computing device and a client computing device for exemplary purposes only. Accordingly, the functionality performed by each of the feature extraction module 312(1) ... (N), the malicious URL detection and categorization module 314(1) ... (N), and the machine learning algorithm(s) 316(1) ... (N) may be i) spread across both server computing devices and client computing devices, ii) completely located on one or more server computing devices, or iii) completely located on one or more client computing devices.

The exemplary computing system 400 in FIG. 4 further illustrates an exemplary server computing device 302 and/or client computing device 306 on which, the feature extraction module 312 extracts URL features. Furthermore, the computing system 400 comprises the malicious URL detection and categorization module 314 that employs the classification models to detect a malicious URL and categorize the malicious URL as one of a phishing URL, a spamming URL, a malware URL or a multi-type attack URL. The computing system may further include the one or more machine learning algorithms 316 configured to construct and incrementally update, using the training data, the classification models.

The exemplary server computing device 302 or client computing device 306 may include one or more processor(s) 310, memory 308, and one or more network interfaces 402. The processor(s) 310 may be a single processing unit or a number of units, all of which could include multiple computing units. The processor(s) 310 may be implemented as one or more microprocessors, microcomputers, microcontrollers, digital signal processors, central processing units, state machines, logic circuitries, and/or any devices that manipulate signals based on operational instructions. Among other capabilities, the processor(s) 310 may be configured to fetch and execute computer-readable instructions stored in the memory 308.

The memory 308 may comprise computer-readable media including, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The network interface(s) 402 enable network communication, and may include one or more ports for connecting the device to the network 304. The network interface(s) 402 can facilitate communications within a wide variety of networks and protocol types, including wired networks (e.g. LAN, cable, etc.) and wireless networks (e.g. WLAN, cellular, satellite, etc.).

As depicted, the feature extraction module 312 includes a lexicology feature extraction module 404, a link popularity feature extraction module 406, a web page feature extraction module 408, a network feature extraction module 410, and a DNS feature extraction 412 that are configured to extract features for a received URL (e.g., a URL submitted as a known training data URL as discussed with respect to FIG. 1 or an unknown URL as discussed with respect to FIG. 2). The modules 404, 406, 408, 410 and 412 may be used independently or in combination to extract a set of one or more URL features.

The malicious URL detection and categorization module 314 may use any combination of extracted features to detect and categorize an unknown URL as a malicious URL. In order to do so, the malicious URL detection and categorization module 314, for example, utilizes a binary classification model 414 and a multi-label classification model 416.

As previously discussed with respect to FIG. 1, the classification models are constructed and adapted during a training stage that submits known training URLs, extracts features from the training URLs, and then employs machine learning algorithms 316 to develop decision criteria for the classification models based on the extracted features.

As illustrated in FIG. 4, the binary classification model 414 and the multi-label classification model 416 are included in the malicious URL detection and categorization module 314. However, it is understood in the context of this document, that the binary classification model 414 and the multi-label classification model 416 may also be separate modules independent of the malicious URL detection and categorization module 314.

For purposes of this document, http://www.exmple.test.mswindows.problematic.com/path1/path2, will be used as an exemplary URL as discussed herein. URLs consist of a domain name, (e.g., 'www.exmple.test.mswindows.problematic.com' is the domain name of the exemplary URL), and a path, (e.g., '/path1/path2' is the path of the exemplary URL). For purposes of this document, a token in a URL are those parts delimited (i.e. separated) by a '.', '/', '?', '=', '-', '_'. Thus, the domain tokens in the exemplary URL include 'www', 'exmple', 'test', 'mswindows', 'problematic' and 'com'. The path tokens in the exemplary URL include 'path1' and 'path2'. Again, the exemplary URL is used for illustrative purposes only. Therefore, it is understood in the context of this document, that both the domain name and the path of a URL may include any number of tokens.

The Lexicology Feature Extraction Module

The lexicology feature extraction module 404 is configured to extract features associated with the lexicology of a URL. Malicious URLs often have lexical features that are distinguishably different from benign URLs. Thus, an analysis of the lexicology of the URL may indicate, at least in part, whether a URL is malicious or benign.

In various embodiments, the lexicology feature extraction module 404 extracts a domain token count for a received URL. The domain token count numerates how many domain tokens are in the domain name of the URL. In the exemplary URL, the domain token count is six because 'www', 'exmple', 'test', 'mswindows', 'problematic' and 'com' are each tokens in the domain name.

In various embodiments, the lexicology feature extraction module 404 extracts a path token count. The path token count numerates how many path tokens are in the path of the URL. In the exemplary URL, the path token count is two because 'path1' and 'path2' are each tokens in the path.

In various embodiments, the lexicology feature extraction module 404 extracts the length of a longest domain token. The longest domain token counts the number of alpha-numeric characters in each domain token, and determines the domain token with the most alpha-numeric characters as the longest domain token. In the exemplary URL, the longest domain token length is eleven because there are eleven alpha-numeric characters in 'problematic', which contains more characters than those found in each of 'www', 'exmple', 'test', 'mswindows' and 'com'.

In various embodiments, the lexicology feature extraction module 404 extracts the length of a longest path token. The longest path token counts the number of alpha-numeric characters in each path token, and determines the path token with the most alpha-numeric characters as the longest path token. In the exemplary URL, the longest path token length is five because there are five alpha-numeric characters in each of 'path1' and 'path2'.

In various embodiments, the lexicology feature extraction module 404 extracts an average domain token length. The average domain token length calculates the average length of all the domain tokens in the URL. In the exemplary URL, the average domain token length is 6 or 6.00, because the total number of alpha-numeric characters in the domain is thirty-six (i.e. 3+6+4+9+11+3), and the domain comprises six tokens.

In various embodiments, the lexicology feature extraction module 404 extracts an average path token length. The average path token length calculates the average length of all the path tokens in the URL. In the exemplary URL, the average path token length is 5 or 5.00, because the total number of alpha-numeric characters in the path is ten (i.e. 5+5), and the path comprises two tokens.

In various embodiments, the lexicology feature extraction module 404 extracts a malicious second-level domain (SLD) hit ratio. A SLD is a domain token that is directly below a top-level domain (TLD). The TLD is the domain token at the highest level in the hierarchical Domain Name System (DNS) of the Internet. Thus, a SLD hit ratio gives weight to a token's position within a URL.

In the exemplary URL, the TLD is 'com'. Thus, the SLD in the exemplary URL is 'problematic'. In order to determine the malicious SLD hit ratio, the lexicology feature extraction module 404 is configured to access the list of known benign URLs and the list of known malicious URLs (as previously stored with respect to FIG. 1). The lexicology feature extraction module 404 then counts the number of times the SLD of a received URL matches an SLD in the list of known malicious URLs (i.e. count1), and counts the number of times the SLD of the received URL matches an SLD in the list of known benign URLs (i.e. count2). The malicious SLD hit ratio is the ratio of these two counts, i.e. count1 divided by count2.

In the exemplary URL, the lexicology feature extraction module 404 will extract the SLD 'problematic' and compare it to the SLDs in the list of known malicious URLs and the list of known benign URLs, to derive the malicious SLD hit ratio.

In various embodiments, the SLD for the received URL is compared separately to the URLs in each of the separate lists according to known phishing URLs, known spamming URLs and known malware URLs (as previously discussed with respect to FIG. 1). Therefore, the lexicology feature extraction module 404 may separately extract a phishing SLD hit ratio, a spamming SLD hit ratio and a malware SLD hit ratio. The malicious URL detection and categorization module 314 may individually consider these separate ratios to help identify the type of malicious URL for categorization purposes.

In various embodiments, the lexicology feature extraction module 404 extracts whether there is a brand name presence in the received URL. Numerous cyber attackers often target widely trusted brand names when using malicious URLs. Therefore, the brand name presence is a binary feature that checks whether a brand name is contained in any of the URL tokens other than the SLD. In order to determine whether a brand name is present the lexicology feature extraction module 404 may access a database, or any online source, that stores brand names common to commerce, sales, retail, media outlets, sports marketing, etc. In the context of this document, a brand name may be a company name, a product name, a famous person's name, a team name, a trademark, a marketing slogan, or the like. In the exemplary URL, the lexicology crawler module 304 will determine that there is a brand name presence because 'mswindows' corresponds to Microsoft® Windows®.

The Link Popularity Feature Extraction Module

The link popularity feature extraction module 406 is configured to extract features associated with link popularity. Link popularity counts the number of incoming links for a target URL. Incoming links are links on other web pages that direct a web user and a web browser to the target URL. Malicious URLs tend to have a low number of incoming links, and thus a low value of link popularity, while benign URLs tend to have a high number of incoming links, and thus a high value of link popularity. Accordingly, link popularity is an effective feature to use when detecting a malicious URL.

The link popularity feature extraction module 406 obtains information associated with link popularity (e.g., the number of incoming links) from known search engines, such as the Microsoft® Bing® search engine. Different search engines may produce different information on link popularities due to different coverage of web pages which the individual search engines crawl. Accordingly, the link popularity feature extraction module 406 may access and obtain information about link popularity from an arbitrary set (e.g. five) of different search engines in the industry, for example.

Moreover, in various embodiments, the link popularity feature extraction module 406 determines link popularities associated with both the whole URL, and separately, the domain of the URL. Thus, using the exemplary URL, the link popularity feature extraction module 406, for example, will access the Microsoft® Bing® search engine, and count the number of incoming links the URL http://www.exmple.test-.mswindows.problematic.com/path1/path2 has in order to determine the link popularity value for the whole URL. Similarly, the link popularity feature extraction module 406 will also count the number of incoming links the domain of the URL, www.exmple.test.mswindows.problematic.com, has in order to determine a separate link popularity value for the domain of the URL. This process is repeated for each different search engine in the arbitrary set, and the extracted link popularity values are then used to detect and categorize malicious URLs.

In various embodiments, the link popularity feature extraction module 406 extracts a distinct domain link ratio in order to combat link manipulation including "link-farming", which links a group of malicious web pages together in order to increase link popularity. The distinct domain link ratio is the number of unique domains that link to the targeted URL (e.g., a URL submitted as previously discussed with respect to FIG. 1 and FIG. 2), compared to the total number of incoming links for the target URL (as provided separately by each search engine in the arbitrary set). For example, when the five total incoming links for a target URL are: www.example.com/page1, www.example.com/page2, www.example.com/page3, www.test.com/page1, and www.test.com/page2, then the number of unique domains is two (i.e. www.example.com and www.test.com). Thus, the distinct domain link ratio is two divided by five, or 0.4.

In various embodiments, the link popularity feature extraction module 406 extracts a maximum domain link ratio to also combat link manipulation. The maximum domain link ratio is the ratio of a maximum number of links from a unique domain compared to the total number of incoming links. Accordingly, using the example in the previous paragraph, the maximum domain link ratio is three divided by five, or 0.6, because www.example.com has the maximum number of incoming links (i.e. three, compared to two for www.test.com) from a unique domain, and there is a total of five incoming links.

Since link-manipulated malicious URLs tend to be linked many times by a few domains, then malicious URLs will trend toward a lower distinct domain link ratio score, and a higher maximum domain link ratio score.

In various embodiments, the link popularity feature extraction module 406 determines a phish link ratio, a spam link ratio and a malware link ratio using the separate lists of known phishing URLs, known spamming URLs and known malware URLs (as previously discussed with respect to FIG. 1).

These separate ratios are determined based on matching a URL of an incoming link with a URL in one of the three lists. For example, if a target URL has a total of five different URLs as incoming links, and three of the incoming links match URLs in the list of known phishing URLs, then the phish link ratio is 3 divided by 5, or 0.6. The type ratios are helpful because malicious URLs often link to other malicious URLs of the same type. Therefore, the three separate ratios help identify the type of malicious URLs for categorization purposes.

The Web Page Feature Extraction Module

The web page feature extraction module 408 is configured to extract features associated with web page content of a URL.

Recently, dynamic web page technology is being exploited by cyber attackers who inject malicious code into web pages via importing and hiding exploits in the web page content. The web page feature extraction module 408 is configured to determine statistical properties of client-side scripting code in the web page content and use the statistical properties to extract features that help detect malicious web pages.

Hypertext markup language (HTML) tags, inline frames (iframes), zero size iframes, a line count associated with the URL, hyperlinks within the URL and scripts within the URL, are each web page content statistical properties that a cyber attacker manipulates in order to import and hide exploits in the web page content.

Thus, the web page feature extraction module 408 is configured to determine a HTML tag count associated with a URL, an iframe count associated with a URL, a zero size iframe count associated with a URL, a line count of a web page associated with a URL (at the HTML document level), a hyperlink count associated with the URL, and a script count associated with a URL.

Injecting hidden malicious iframes into compromised legitimate web pages is a popular form of a malware attack. Invisible iframes allow for silent loading of exploits from illegitimate web pages while an unsuspecting web user is browsing visible content of the compromised legitimate web page. Other statistics such as script count, iframe count and hyperlink count are useful features to distinguish malicious web pages. Accordingly, these extracted features may be utilized to detect and categorize a malicious URL In various embodiments, the web page feature extraction module 408 counts the number of calls to a specific set of script functions in processing and rendering the web page content of a URL. This specific set of script functions are the script functions commonly used by cyber attackers, such as native JavaScript functions: escape( ), eval( ), link( ), unescape( ), exec( ). link( ), and search( ) functions, for example. The count of actual calls to script functions in rendering a URL helps contribute to the detection of malicious URLs.

The Network Feature Extraction Module

The network feature extraction module 410 is configured to extract features associated with network properties of a URL. The network feature extraction module 410 extracts the features associated with network properties by accessing URLs (e.g., visiting the URL) received as previously discussed with respect to FIG. 1 and FIG. 2.

Cyber attackers commonly try to hide their malicious web pages using multiple redirections, such as iframe redirection. Furthermore, benign (e.g., legitimate) URLs and their hosting service providers typically provide better service quality compared to malicious URLs and their hosting service providers. Therefore, benign URLs, which are more popular and more frequently visited compared to malicious URLs, are easier to access and faster to download compared to malicious URLs.

Accordingly, in various embodiments, the network feature extraction module 410 counts the number of redirections for a URL. URL redirection is when the same web page is made available via multiple different URLs (e.g., a very short URL redirects to a target URL). Iframe redirection is when an HTML frame redirects to the target URL. Accordingly, the network feature extraction module 410 may count the redirections associated with a received URL.

Since the quality of service is distinguishable between a benign URL and a malicious URL, in various embodiments, the network feature extraction module 410 may determine how long it takes to lookup a domain and then record a domain lookup time for the received URL. Additionally, in various embodiments, the network feature extraction module 410 may measure and record an average download speed associated with how long it takes to download the received URL. Malicious URLs often have a longer domain lookup time and slower average download speed when compared to benign URLs.

Moreover, cyber attackers often hide data in the payload of hypertext transfer protocol (HTTP) packets when implementing buffer overflow attacks by setting a malformed (e.g., negative) content-length in a HTTP packet. This leads to a large discrepancy between the nominal downloaded bytes calculated from the content-length of HTTP packets and the actual received bytes. Therefore, comparing the nominal downloaded bytes with the actual downloaded bytes for a URL provides an indication of whether the URL is a malicious URL. Accordingly, in various embodiments, the network feature extraction module 410 accesses an actual number of downloaded bytes for the received URL. Further, the network feature extraction module 410 determines the nominal downloaded bytes by adding the bytes in the content-length field of each HTTP packet for the received URL.

The DNS Feature Extraction Module

The DNS feature extraction module 412 is configured to extract DNS features associated with the URL and DNS fluxiness features associated with the URL. The DNS feature extraction module 412 may extract the features by sending queries to a DNS server.

Malicious URLs are commonly hosted by service providers who may be known to host malicious URLs. Typically, the service providers hosting malicious URLs comprise a limited number of name servers across a small Internet Protocol (IP) address space.

Accordingly, in various embodiments, the DNS feature extraction module 412 counts the number of resolved IPs for the domain of a received URL. The domain of a benign URL will have a higher resolved IP count, compared to the domain of a malicious URL, because the popular use of a legitimate domain (e.g., a benign URL) will cover a broader IP address space, and therefore have more resolved IPs compared to a malicious URL.

In various embodiments, the DNS feature extraction module 412 counts the number of name servers that serve the domain of the URL. As previously discussed, benign URLs commonly have numerous name servers supporting a popular and well-frequented URL, compared to a malicious URL hosted by a disreputable service provider comprising a limited number of named servers supporting the malicious URL.

In various embodiments, the DNS feature extraction module 412 counts the number of IPs the name servers hosting the received URL are associated with. Again, identified name servers hosting a benign URL will more likely be associated with numerous IPs (e.g., broader IP address coverage) compared to name servers hosting a malicious URL (e.g., limited IP address coverage).

Furthermore, an autonomous system number (ASN), which officially registers and identifies service providers, may also be used to determine whether a URL is being hosted by a disreputable service provider. In order to do this, the malicious URL detection and categorization system records and maintains ASNs of resolved IPs and ASNs of the name servers, for each URL in the list of known benign URLs and the list of known malicious URLs (as previously discussed with respect to FIG. 1).

Then, in various embodiments, the DNS feature extraction module 412 calculates a malicious ASN ratio of resolved IPs by counting how many times ASNs of resolved IPs associated with a received URL match an ASN of a resolved IP associated with a known URL in the malicious URL list. Similarly, DNS feature extraction module 412 counts how many times ASNs of resolved IPs associated with the received URL match an ASN of a resolved IP associated with a known URL in the benign URL list. The malicious ASN ratio of resolved IPs is the number of malicious hits compared to the number of benign hits.

In various embodiments, the DNS feature extraction module 412 calculates a malicious ASN ratio of name server IPs by counting how many times ASNs of name server IPs associated with a received URL match an ASN of a name server IP associated with a known URL in the malicious URL list. Similarly, the DNS feature extraction module 412 counts how many times ASNs of name server IPs associated with the received URL match an ASN of a name server IP associated with a known URL in the benign URL list. The malicious ASN ratio of name server IPs is again the number of malicious hits compared to the number of benign hits.

Furthermore, the DNS feature extraction module 412 may extract URL features associated with DNS fluxiness. Recently, fast-flux service networks (FFSN) have begun establishing readily available proxy networks that host illegal online services. Cyber attackers often employ FFSNs as a means to provide malicious URLs.

To combat FFSNs, the DNS feature extraction module 412 looks-up a domain name of a received URL, and then repeats the domain name lookup after a Time-To-Live value in a DNS packet has timed-out. This provides consecutive lookups of the same domain. For the domain of the received URL, let $N_{IP}$ and $N_{AS}$ represent the total number (i.e. in all of the domain name lookups) of unique IPs and ASNs for each unique IP, respectively. Additionally, let $N_{NS}$, $N_{NSIP}$, and $N_{NSAS}$ be the total number of unique name servers, name server IPs, and ASNs of the name server IPs in all of domain name lookups for the received URL, respectively. Using the acquired information, the DNS feature extraction module 412 can estimate DNS fluxiness of a resolved IP (e.g., $N_{IP}$) address according to the equation (1) that follows:

$$\phi = N_{IP}/N_{single}, \qquad (1)$$

where $\phi$ is the DNS fluxiness of the domain and the value $N_{single}$ is the number of IPs a single lookup returns.

Similarly, the DNS feature extraction module 412 can estimate DNS fluxiness features for $N_{AS}$, $N_{NS}$, $N_{NSIP}$, and $N_{NSAS}$ by substituting these values for $N_{IP}$ in equation (1), and using a corresponding $N_{single}$ for a single lookup.

The resulting values indicate a change in a number of new resolved IPs and ASNs over time. Since FFSNs change their IPs and ASNs rapidly, measuring the number of IP and ASN counts help determine whether the URL is a malicious URL based on fluxiness.

It is understood in the context of this document, that the lexicology feature extraction module 404, the link popularity feature extraction module 406, the web page feature extraction module 408, the network feature extraction module 410, and the DNS feature extraction module 412 may extract any combination of the features discussed above for purposes of training the classification models, and detecting and categorizing URLs as potentially malicious URLs. For example, some features may not be available due to a DNS server failure, or the like Additionally, it is understood that some of the extracted features may be more effective at detecting and categorizing a particular type of malicious URLs. Accordingly, the classification models use the extracted features, to not only detect malicious URLs, but also categorize the URL as one or a plurality of a phishing URL, a spamming URL, a malware URL, or a multi-type attack URL.

Once the feature extraction module 312 extracts the URL features, the malicious URL detection and categorization module 414 may employ a binary classification model 414 to classify an unknown URL as a benign or malicious URL.

In various embodiments, the machine learning algorithm 316 employed to train the binary classification model 414 is a Support Vector Machine (SVM). SVM is used to construct hyperplanes in a high or infinite dimensional space which can be used for binary classification. Based on a Structural Risk Maximization theory, SVM finds the hyperplane that has the largest distance to the nearest training data points of any class, called functional margin. Functional margin optimization can be achieved by maximizing equation (2) as follows:

$$\sum_{i=1}^{n} \alpha_i - \frac{1}{2} \sum_{i,j=1}^{n} \alpha_i \alpha_j y_i y_j K(x_i, x_j), \quad (2)$$

subject to equation (3) as follows:

$$\sum_{i=1}^{n} \alpha_i y_i = 0, 0 \leq \alpha_i \leq C, i = 1, 2, \ldots, n, \quad (3)$$

where $\alpha_i$ and $\alpha_j$ are assigned coefficients of training samples $x_i$ and $x_j$. $K(x_i, x_j)$ is a kernel function used to measure the similarity between the two samples. After specifying the kernel function, SVM computes the coefficients which maximize the margin of correct classification on the training set. C is a regulation parameter used for tradeoff between training error and margin, training accuracy and model complexity.

Accordingly, in various embodiments, the SVM is employed to accept information associated with the each of the extracted features, or a subset of the extracted features, as previously discussed. Then the SVM is applied to construct or update the binary classification model 414 (e.g., adapt decision criteria).

In various embodiments, the malicious URL detection and categorization module 314 may optionally employ a multi-label classification model 416 to further categorize the type of attacks the malicious URL attempts to launch. Thus, the malicious URL may be labeled accordingly as a phishing URL, a spamming URL, a malware URL, or a multi-type attack URL if the malicious URL attempts to launch a multiple different types of attacks.

In various embodiments, the machine learning algorithm 316 employed to train the multi-label classification model 416 is RAkEL, a high-performance multi-label learning algorithm that accepts a multi-label learner as a parameter. RAkEL creates m random sets of k label combinations and builds an ensemble of label powerset classifiers from each of the m random sets. The label powerset is a transformation-based algorithm that accepts a single-label classifier as a parameter. It considers each distinct combination of labels that exist in the training set as a different class value of a single-label classification task.

In RAkEL, a ranking of the labels is produced by averaging the zero-one predictions of each model per considered label. An ensemble voting process under a threshold t is then employed to make a decision for the final classification set.

In an alternative embodiment, the machine learning algorithm 316 employed to train the multi-label classification model 416 is ML-kNN, which is derived from the conventional k-Nearest Neighbor algorithm. For each unseen instance, k nearest neighbors in the training set are identified first. After that, based on statistical information gained from the label sets of these neighboring instances, maximum a posteriori principle is utilized to determine the label set for the unseen instance.

Thus, the multi-label classification model 416 categorizes a malicious URL by labeling the malicious URL as one a phishing URL, a spamming URL, a malware URL, or a multi-type attack URL.

Additionally, the memory 308 includes an output module 418 configured to output results based on the functionality of the feature extraction module 312, the malicious URL detection and categorization module 314, and the machine learning algorithm(s) 316.

Illustrative Processes

Example operations are described herein with reference to FIG. 5 and FIG. 6. The processes are illustrated as logical flow graphs, which represent a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 5 depicts an exemplary process 500 that trains the classification models. At 502, a set of known URLs is received as training data URLs. The set of known URLs may include, known benign URLs and known malicious URLs. Furthermore, the known malicious URLs may further be labeled as a phishing URL, a spamming URL, a malware URL, or any combination thereof. The training data URLs are used to train the classification models.

At 504, the feature extraction module 312 extracts features associated with each URL in the received set of known URLs. As discussed above with respect to FIG. 4, the feature extraction module 312 utilizes the lexicology feature extraction module 404, the link popularity feature extraction module 406, the web page feature extraction module 408, the network feature extraction module 410, and the DNS feature extraction module 412 to extract lexical features, link popularity features, web page content features, network features, DNS features and DNS fluxiness features associated with each URL.

At 506, the system employs the machine learning algorithms 316 to construct and/or update the binary classification model 414 and the multi-label classification model 416 using the information associated with the extracted features. The constructing and updating of the classification models may continually adapt a decision criteria used to classify the received URLs in order to provide improved results.

FIG. 6 illustrates an example online process 600 that can be implemented by the feature extraction module 312 and the malicious URL detection and categorization module 314.

At block 602, an unknown URL is received via a user action, such as data entry (e.g., text entry) into a web browsing entry window or a search engine, an embedded link selection via a mouse click, and so forth.

At block 604, the feature extraction module 312 extracts features associated with the received unknown URL.

At block 606, the malicious URL detection and categorization module 314 employs the classification models to detect and optionally, categorize an unknown URL as a malicious URL.

At block 608, the process decides how to inform the web user of the results. If the URL is a malicious URL, at 610 the output module 418 indicates the URL is a malicious URL to the web user, and optionally labels the malicious URL as a phishing URL, a spamming URL, a malware URL, or any combination thereof (e.g., a multi-type attack URL). Accordingly, the malicious URL detection and categorization module 314 may indicate the type(s) of attacks the malicious URL attempts to launch. For example, this indication may be in the form of a warning to the user which then allows the user to proceed if she or he wishes. Or, the malicious URL detection and categorization module 314 may indicate that the web user is prevented from visiting the malicious URL altogether.

If the URL is a benign URL, at 612 the output module 418 retrieves and presents the URL to the web browser, search engine, web user, and the like.

Conclusion

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A method comprising:
receiving a uniform resource locator (URL);
extracting features associated with the URL, the features including a distinct domain link ratio that compares a number of unique domains that link to the received URL to a total number of incoming links that link to the received URL;
employing, via one or more processors, a binary classification model to determine that the URL is a malicious URL based at least in part on the extracted features; and
categorizing the malicious URL as one of a spam URL, a phishing URL, a malware URL, or a multi-type attack URL.

2. The method as recited in claim 1, wherein the categorizing employs a multi-label classification model to label the malicious URL in accordance with the categorization, the method further comprising:
processing a set of training URLs;
employing a binary classification machine learning algorithm to construct a detection decision criteria used by the binary classification model based at least in part on information extracted from the set of training URLs; and
employing a multi-label classification machine learning algorithm to construct a labeling decision criteria used by the multi-label classification model based at least in part on information extracted from the set of training URLs.

3. The method as recited in claim 2, wherein:
the binary classification machine learning algorithm is a support vector machine (SVM); and
the multi-label classification machine learning algorithm is selected from RAkEL or ML-kNN.

4. The method as recited in claim 1, wherein at least one feature extracted is a lexical feature selected from a group comprising:
a domain token count,
a path token count,
a longest domain token length,
a longest path token length,
an average domain token length,
an average path token length, and
a brand name presence.

5. The method as recited in claim 1, wherein at least one feature extracted is a lexical feature that determines a second level domain hit ratio for the received URL, wherein the second level domain hit ratio is based on how many times a second level domain of the received URL matches a corresponding second level domain of a known malicious URL compared to how many times the second level domain of the received URL matches a corresponding second level domain of a known benign URL.

6. The method as recited in claim 1, wherein at least one feature extracted is a link popularity feature selected from a group comprising:
a maximum domain link ratio,
a phishing link ratio,
a spamming link ratio, and
a malware link ratio.

7. The method as recited in claim 1, wherein at least one feature extracted is a web page feature selected from a group comprising:
a hyper-text markup language (HTML) tag count,
an iframe count,
a zero size iframe count,
a line count,
a hyperlink count,
a script count, and
a script function count.

8. The method as recited in claim 1, wherein at least one feature extracted is a network feature selected from a group comprising:
a redirection count,
a download packet content length,
actual downloaded bytes,
a domain lookup time, and
a download speed.

9. The method as recited in claim 1, wherein at least one feature extracted is a domain name system (DNS) feature selected from a group comprising:
a resolved internet protocol (IP) count,
a name server count,
a name server IP count,
a malicious autonomous system number (ASN) ratio of resolved IPs, and
a malicious ASN ratio of name server IPs.

10. The method as recited in claim 1, wherein at least one feature extracted is a domain name system (DNS) fluxiness feature which indicates a change in domain name properties between DNS lookups.

11. The method as recited in claim 1, further comprising:
extracting at least one lexical feature, at least one web page content feature, at least one network feature, at least one domain name system (DNS) feature, and at least one DNS fluxiness feature; and
combining the at least one link popularity feature, the at least one lexical feature, the at least one web page content feature, the at least one network feature, the at least one domain name system (DNS) feature, and the at least one DNS fluxiness feature to arrive at a set of features used to determine that the URL is a malicious URL.

12. A system comprising:
one or more processors;
one or more memories;
a link popularity feature extraction module, stored on the one or more memories and operable by the one or more processors, that extracts link popularity features;
a binary classification model, stored on the one or more memories and operable by the one or more processors, that uses the link popularity features to classify a received uniform resource locator (URL) as a malicious URL or a benign URL; and
a multi-label classification model, stored on the one or more memories and operable by the one or more processors, that uses the link popularity features to classify the received URL as one of a phishing URL, a spamming URL, a malware URL, or a multi-type attack URL when the received URL is a malicious URL.

13. The system of claim 12, further comprising:
a lexicology feature extraction module, stored on the one or more memories and operable by the one or more processors, that extracts lexical features associated with the received URL;
a web page feature extraction module, stored on the one or more memories and operable by the one or more processors, that extracts web page content features associated with the received URL;
a network feature extraction module, stored on the one or more memories and operable by the one or more processors, that extracts network features associated with the received URL; and
a domain name system (DNS) feature extraction module, stored on the one or more memories and operable by the one or more processors, that extracts DNS features and DNS fluxiness features associated with the received URLs.

14. A method comprising:
receiving a uniform resource locator (URL) from a web browser or a search engine;
extracting one or more link popularity features associated with the URL;
employing one or more classification models to determine whether the URL is a malicious URL based on the one or more link popularity features; and
in an event the URL is a malicious URL:
  employing the one or more classification models to label the malicious URL as one of a spam URL, a phishing URL, a malware URL, or a multi-type attack URL; and
providing, via a computing device, a notification that the URL is malicious.

15. The method as recited in claim 14, further comprising:
extracting one or more lexical features, one or more web page content features, one or more network features, one or more domain name system (DNS) features, and one or more DNS fluxiness features; and
further employing the one or more classification models to determine whether the URL is a malicious URL based on the one or more lexical features, the one or more web page content features, the one or more network features, the one or more domain name system (DNS) features, and the one or more DNS fluxiness features.

16. The method as recited in claim 14, further comprising adapting the one or more classification models using one or more learning algorithms when the URL is verified as a benign URL, or verified as a malicious URL of a known type.

17. The method as recited in claim 14, further comprising constructing the one or more classification models using one or more learning algorithms and a set of known malicious URLs and known benign URLs.

* * * * *